(12) United States Patent
DePodwin et al.

(10) Patent No.: US 10,838,109 B2
(45) Date of Patent: Nov. 17, 2020

(54) SYSTEM AND METHOD FOR FORECASTING SNOWFALL PROBABILITY DISTRIBUTIONS

(71) Applicant: Accuweather, Inc., State College, PA (US)

(72) Inventors: Daniel DePodwin, State College, PA (US); Jonathan Porter, State College, PA (US); Michael R. Root, Edmond, OK (US)

(73) Assignee: AccuWeather, Inc., State College, PA (US)

( * ) Notice: Subject to any disclaimer, the term of this patent is extended or adjusted under 35 U.S.C. 154(b) by 330 days.

(21) Appl. No.: 15/941,662

(22) Filed: Mar. 30, 2018

(65) Prior Publication Data

US 2018/0284322 A1 Oct. 4, 2018

Related U.S. Application Data

(60) Provisional application No. 62/479,062, filed on Mar. 30, 2017.

(51) Int. Cl.
*G01W 1/10* (2006.01)
*G06N 7/00* (2006.01)
(Continued)

(52) U.S. Cl.
CPC .............. *G01W 1/10* (2013.01); *G01W 1/14* (2013.01); *G06N 5/048* (2013.01); *G06N 7/005* (2013.01)

(58) Field of Classification Search
CPC .......... G01W 1/10; G01W 1/14; G06N 5/048; G06N 7/005
See application file for complete search history.

(56) References Cited

U.S. PATENT DOCUMENTS 5,406,481 A 4/1995 Shinozawa et al.
6,535,817 B1 3/2003 Krishnamurti
(Continued)

FOREIGN PATENT DOCUMENTS

JP 2008185489 A 8/2008
TW 201539019 A 10/2015

OTHER PUBLICATIONS

Barnwell, J.M., "Verification of the Cobb Snowfall Forecasting Algorithm", Thesis, U. Nebraska, May 2011.*

*Primary Examiner* — Catherine T. Rastovski
(74) *Attorney, Agent, or Firm* — Pillsbury Winthrop Shaw Pittman LLP

(57) ABSTRACT

Currently available weather forecasts, which include a specific snowfall accumulation or range, do not convey the probability that snowfall will be within the forecasted snowfall accumulation range, probabilities of other snowfall accumulation amounts, or a forecaster's level of confidence. A snowfall probability distribution forecasting system is disclosed that uses a rules-based process to leverage third party weather forecasts, including members of ensemble forecasts, to generate snowfall probability distributions forecasting the most likely snowfall accumulation range, the probability that snowfall accumulation will be within the most likely snowfall accumulation range, and probabilities that snowfall accumulation will be outside of the most likely snowfall accumulation range. To ensure consistency with the deterministic forecast, the snowfall probability distribution may be shifted based on a deterministic forecast. Because third party weather forecasts can produce a non-normal distribution of snowfall accumulation forecasts, the snowfall probability distribution may be normalized.

21 Claims, 10 Drawing Sheets

(51) Int. Cl.
*G06N 5/04* (2006.01)
*G01W 1/14* (2006.01)

(56) References Cited

U.S. PATENT DOCUMENTS

| | | |
|---|---|---|
| 7,542,852 B1 | 6/2009 | Rose |
| 2008/0147417 A1 | 6/2008 | Friedberg |
| 2012/0101880 A1 | 4/2012 | Alexander |
| 2014/0303893 A1 | 10/2014 | LeBlanc |
| 2014/0303983 A1* | 10/2014 | Bapat ........................ H04K 1/00 704/273 |
| 2015/0178572 A1 | 6/2015 | Omer et al. |
| 2016/0231463 A1 | 8/2016 | Smith |
| 2016/0300172 A1* | 10/2016 | Bangalore ........ G06Q 10/06315 |
| 2017/0357920 A1* | 12/2017 | Stewart ............. G06Q 10/0635 |

* cited by examiner

SYSTEM AND METHOD FOR FORECASTING SNOWFALL PROBABILITY DISTRIBUTIONS

CROSS REFERENCE TO RELATED APPLICATIONS

This application claims priority to U.S. Provisional Patent Application No. 62/479,062 filed Mar. 30, 2017, the entire contents of which is hereby incorporated by reference.

BACKGROUND

Snowfall accumulation forecasts are of tremendous value to individuals and organizations. Not only do consumers and businesses use snowfall accumulation forecasts for planning purposes, but transportation systems and other critical systems components use forecasts of snowfall and other precipitation to adjust operations, prevent damage to infrastructure, and avoid events that could be hazardous to the public.

Current forecasting methods produce deterministic forecasts for snowstorms. Those deterministic forecasts include a specific snowfall accumulation (often a range) at a specific time and place representing a best guess of a meteorologist (or group of meteorologists) making subjective determinations based on information from mathematical models and the meteorologist's training and experience. Those deterministic forecasts are of tremendous interest, but do not convey additional information such as the probability that snowfall will be within the forecasted snowfall accumulation range and the probabilities of other snowfall accumulation amounts. Deterministic forecasts also do not convey a forecaster's level of confidence or how that confidence could morph over time.

A probability distribution, rather than a deterministic forecast, would convey a deeper understanding of the broad range of potential outcomes for each snowstorm and the likelihood of those outcomes.

Modern forecasters have access to dozens of weather forecasts, including ensemble forecasts that use the same mathematical model to perform multiple simulations (called "members") in an attempt to account for the two usual sources of uncertainty in forecast models (errors introduced by the use of imperfect initial conditions and errors introduced because of imperfections in the model formulation). No existing weather forecast provides a probability distribution, for snowfall accumulation or otherwise. Instead, each weather forecast (or member) can be used to generate a single deterministic forecast.

U.S. Pat. Pub. No. 2014/0303893 to LeBlanc describes a system that generates a probability distribution of snowfall rates by combining a probability of snowfall with a probability distribution of overall precipitation rates. However, the LeBlanc system requires both calculating the probability of snowfall and generating a probability distribution of overall precipitation rates, which are both difficult to do with precision using existing weather forecasting methods.

Given the desire for a more accurate assessment of the broad range of potential outcomes for each snowstorm and the drawbacks of both existing weather forecasts and weather forecasting systems, there is a need for a rules-based process to generate snowfall probability distributions forecasting a plurality of snowfall accumulation ranges and the probability that snowfall accumulation will be within each of those ranges. Furthermore, to avoid confusing users, it is important that the rules-based process generates snowfall probability distributions that are consistent with a deterministic forecast for the same location and time period and reflect a normal distribution from the most likely snowfall accumulation range to the tails of the probability distribution.

SUMMARY

In order to overcome those and other drawbacks in the prior art, a snowfall probability distribution forecasting system is disclosed that uses a rules-based process to leverage third party weather forecasts, including members of ensemble forecasts, to generate snowfall probability distributions forecasting the most likely snowfall accumulation range, the probability that snowfall accumulation will be within the most likely snowfall accumulation range, and probabilities that snowfall accumulation will be outside of the most likely snowfall accumulation range.

The snowfall probability distribution forecasting system stores a plurality of weather forecasts, identifies a predicted location and a predicted time period of a snowstorm, determines a snowfall accumulation forecast based on each of the plurality of weather forecasts, forms an ensemble histogram by identifying a series of consecutive, non-overlapping snowfall accumulation ranges and determining how many of the snowfall accumulation forecasts are in each of the snowfall accumulation ranges, calculates a probability density function representing the relative likelihood of snowfall accumulation amounts based on the ensemble histogram, forms a snowfall probability distribution based on the probability density function, generates a snowfall probability forecast (that includes the most likely snowfall accumulation range and the probability that snowfall accumulation in the predicted location over the predicted time period will be within the most likely snowfall accumulation range), and outputs the snowfall probability forecast.

To ensure consistency between a deterministic forecast and the most likely snowfall accumulation range indicated by a snowfall probability distribution, the snowfall probability distribution forecasting system may shift the snowfall probability distribution so that the forecasted snowfall accumulation in the deterministic forecast falls within the most likely snowfall accumulation range of the snowfall probability distribution. Furthermore, because third party weather forecasts can produce a non-normal distribution of snowfall accumulation forecasts, the snowfall probability distribution forecasting system may normalize the data so that the probabilities of each snowfall accumulation range decrease from the most likely snowfall accumulation range of the snowfall probability distribution to the tails of the snowfall probability distribution.

BRIEF DESCRIPTION OF THE DRAWINGS

Aspects of exemplary embodiments may be better understood with reference to the accompanying drawings, wherein.

DETAILED DESCRIPTION

Figure 1:
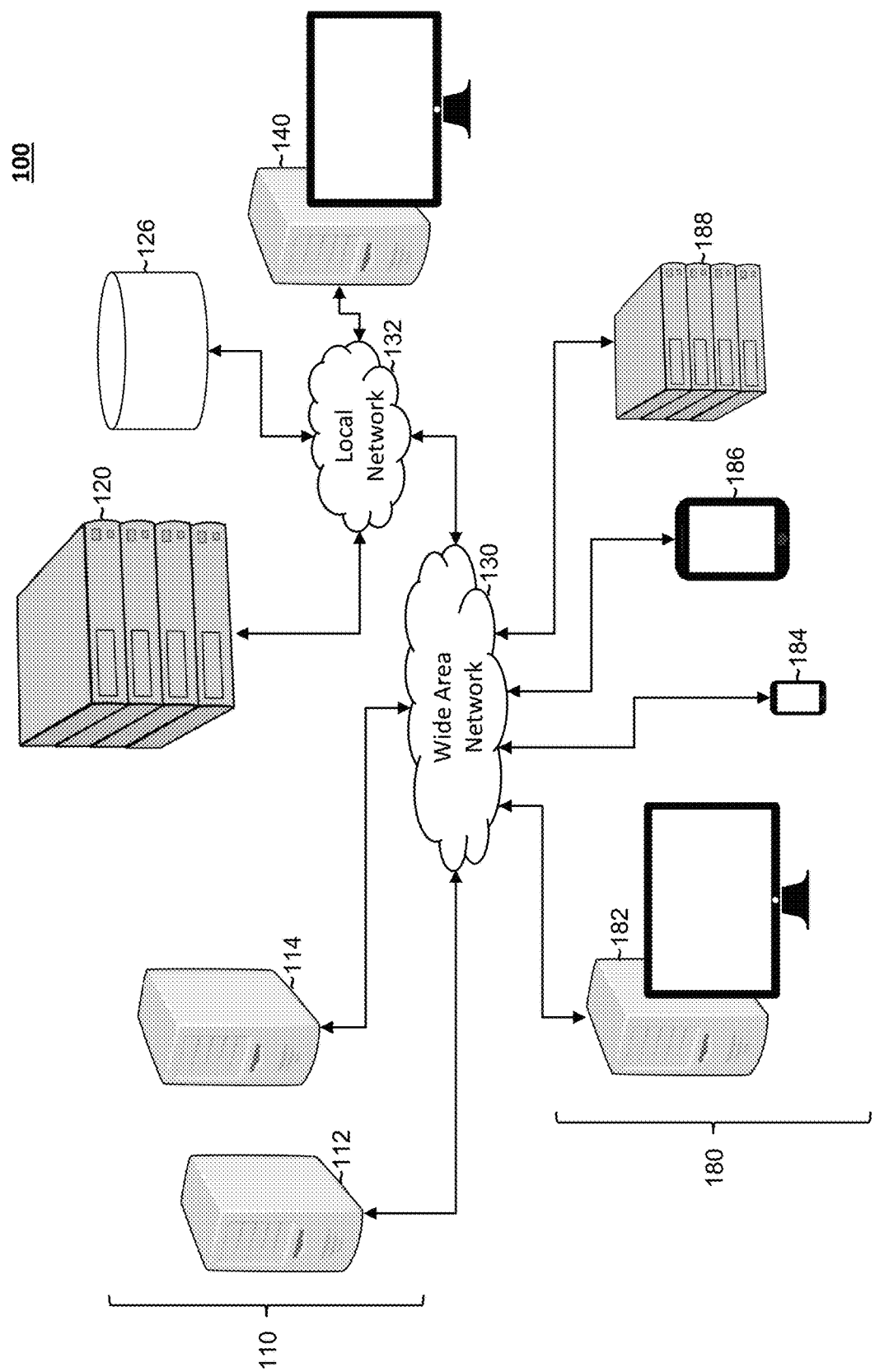
FIG. 1 is a diagram illustrating an architecture of a snowfall probability distribution forecasting system according to an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is a diagram illustrating an architecture 100 of a snowfall probability distribution forecasting system 200 according to an exemplary embodiment of the present invention.

As shown in FIG. 1, the architecture 100 includes one or more servers 120 that receive information from third party data sources 110 and communicate with remote client devices 180 via a wide area network 130, such as the internet. The one or more servers 120 may also store data on and read data from non-transitory computer readable storage media 126. The one or more servers 120 may also communicate with one or more local client devices 140 either directly (via a wired and/or wireless communication path) or via a local area network 132.

The third party data sources 110 may include, for example, servers maintained by the National Center for Environmental Predictions (NCEP server 112) and the European Centre for Medium-Range Weather Forecasts (ECMWF server 114). Additional third party data sources 110 may include the National Weather Service (NWS), the National Hurricane Center (NHC), Environment Canada, other governmental agencies (such as the U.K. Meteorologic Service, the Japan Meteorological Agency, etc.), private companies (such as Vaisalia's U.S. National Lightning Detection Network, Weather Decision Technologies, Inc.), individuals (such as members of the Spotter Network), etc.

Each of the one or more servers 120 may be any suitable hardware computing device configured to send and/or receive data via the networks 130 and 132. Each of the one or more servers 120 include internal non-transitory storage media and at least one hardware computer processor. The one or more servers 120, may include, for example, an application server and a web server that hosts websites accessible to any of the remote client devices 180 that include a web browser.

The non-transitory computer-readable storage media 126 may include hard disks, solid-state memory, etc. The non-transitory computer-readable storage media 126 may be internal to one of the servers 120 or external to the one or more servers 120. The one or more servers 120 may communicate with the non-transitory computer-readable storage media 126 via a wired and/or wireless communication path and/or via the network 132.

The networks 130 and 132 may include any combination of the internet, cellular networks, wide area networks (WAN), local area networks (LAN), etc. Communication via the network(s) 130 and 132 may be realized by wired and/or wireless communication paths.

Each of the one or more local client devices 140 may be any suitable hardware computing device configured to send and receive data via the network 132. Each of the one or more local client devices 140 include internal non-transitory storage media and at least one hardware computer processor. Each of the one or more local client devices 140 may be, for example, a personal computing device (e.g., a desktop computer, a notebook computer, a tablet, a smartphone, etc.).

Each of the remote client devices 180 may be any suitable hardware computing device configured to receive data via the network 130. Each of the remote client devices 180 include internal non-transitory storage media and at least one hardware computer processor. The remote client devices 180 may include personal computing devices (e.g., desktop computers 182, notebook computers, tablets 186, smartphones 184, etc.) that receive and display information received from the network 130 via a web browser, software applications installed locally or remotely (e.g., on a server 120), etc. The remote client devices 180 may include smartphones 184 and/or tablets 186 that receive and display information received from the network 130 via mobile applications, etc. In the simplest embodiments, the remote client devices 180 receive snowfall probability distributions generated by the snowfall probability distribution forecasting system 200 and display those snowfall probability distributions to a user (e.g., via a web browser, mobile application, etc.). As will be described in more detail below, the remote client devices 180 may also include other suitable hardware computing devices 188 that receive snowfall probability distributions generated by the snowfall probability distribution forecasting system 200 and, in addition to or in lieu of displaying those snowfall probability distributions to a user, control a hardware or software device in response to information included in a snowfall probability distribution.

Figure 2:
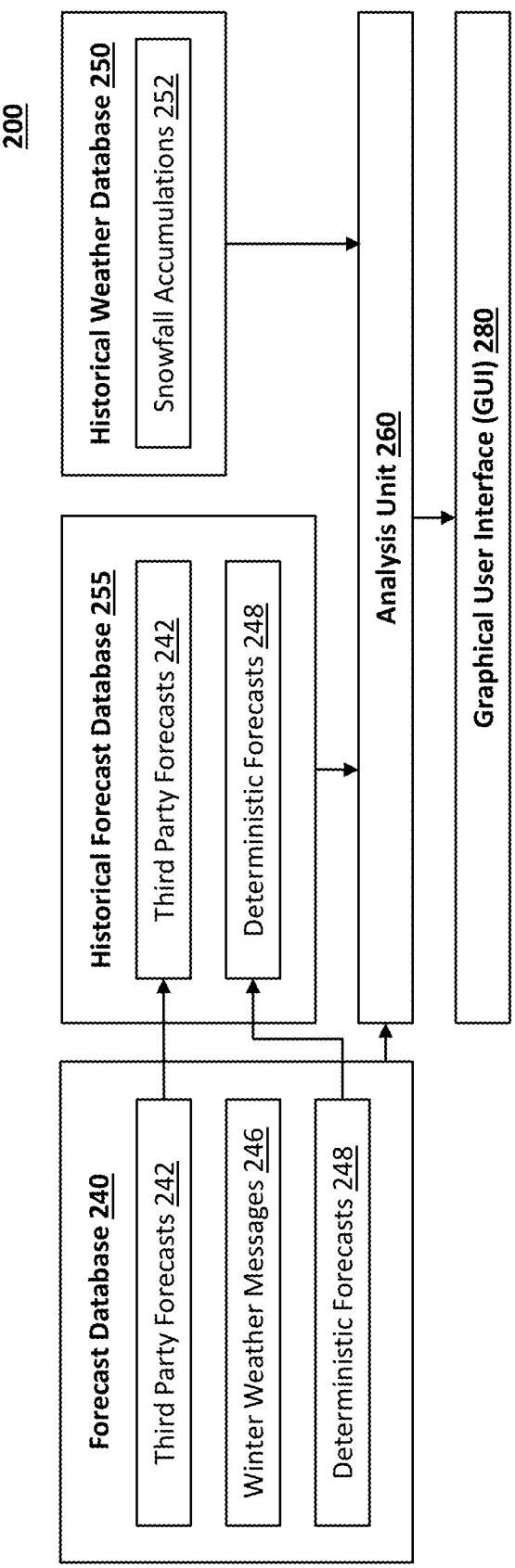
FIG. 2 is a block diagram illustrating the snowfall probability distribution forecasting system according to an exemplary embodiment of the present invention.

FIG. 2 is a block diagram illustrating the snowfall probability distribution forecasting system 200 according to an exemplary embodiment of the present invention.

As shown in FIG. 2, the snowfall probability distribution forecasting system 200 includes a forecast database 240, an analysis unit 260, and a graphical user interface 280. The snowfall probability distribution forecasting system 200 may further include a historical weather database 250 and a historical weather forecast database 255.

The forecast database 240 may be any organized collection of information, whether stored on a single tangible device or multiple tangible devices (e.g., the non-transitory computer readable storage media 126). The forecast database 240 stores third party weather forecasts 242 received from the third party data sources 110 and deterministic forecasts 248 generated using the one or more servers 120 and/or the one or more local client devices 140. The forecast database 240 may also store winter weather messages 246 issued by government agencies (e.g., the NWS, local NWS offices, etc.).

The third party weather forecasts 242 are generated using mathematical models of the atmosphere and oceans that forecast future weather conditions based on estimates of the current weather conditions. The third party weather forecasts 242 may include, for example, quantitative precipitation forecasts as well as forecasts for temperature, vertical motion, and relative humidity. The third party weather forecasts 242 may be ensemble forecasts, which include a number of separate forecasts (called "members"). An ensemble forecast uses the same mathematical model to perform multiple simulations in an attempt to account for the two usual sources of uncertainty in forecast models: the errors introduced by the use of imperfect initial conditions and errors introduced because of imperfections in the model formulation. Accordingly, as used below, the third party weather forecasts 242 refers to each member of an ensemble forecast.

The third party weather forecasts 242 may include, for example, one deterministic run of the National Centers for Environmental Prediction (NCEP) Global Forecast System (GFS), members (e.g., 20 members) of the Global Ensemble Forecast System (GEFS), members (e.g., 26 members) of the Storm Prediction Center (SPC) Short Range Ensemble Forecast (SREF), members (e.g., 26 members) of the European Centre for Medium-Range Weather Forecasts (EC-MWF) ensemble prediction system. The NCEP GFS forecast, the GEFS members, and the SREF members may be received from the NCEP server 112. The ECMWF members may be received from the ECMWF server 114.

Winter weather messages 246 are issued by the NWS (and/or local offices) in advance of forecasted winter weather. Winter weather messages include winter storm warnings, winter storm watches, and winter weather advisories.

The deterministic forecasts 248 may also be generated using one or more mathematical models. However, the deterministic forecasts 248 may be generated or modified by a meteorologist making subjective determinations based on information from those one or more mathematical models and his or her training and experience. A "deterministic forecast" is a prediction of an event of a specific magnitude (or range of magnitudes) in a predicted location during a predicted time period (e.g., 8 inches of snowfall in Philadelphia between Mar. 20, 2018, and Mar. 22, 2018). The deterministic forecast 248 may be generated by one or more meteorologists.

The optional historical weather database 250 may be any organized collection of information, whether stored on a single tangible device or multiple tangible devices (e.g., the non-transitory computer readable storage media 126). The historical weather database 250 may store geo-located and time-indexed information indicative of past snowfall accumulations 252.

The optional historical weather forecast database 255 may be any organized collection of information, whether stored on a single tangible device or multiple tangible devices (e.g., the non-transitory computer readable storage media 126). The historical weather forecast database 255 may store the third party weather forecasts 242 and the deterministic forecasts 248 for the locations and time periods of the past snowfall accumulations.

The analysis unit 260 includes a hardware computer processor and software instructions accessible to and executed by the hardware computer processor. The analysis unit 260 may be any suitable combination of hardware and software configured to receive the third party weather forecasts 242 and deterministic forecasts 248, generate the snowfall probability distributions based on the third party weather forecasts 242 and the deterministic forecasts 248 as described in detail below, and output those snowfall probability distributions to the remote client devices 180. The analysis unit 260 may include, for example, the Grid Analysis and Display System (GrADS)™, which is an interactive desktop tool that is used for easy access, manipulation, and visualization of earth science data. The analysis unit may be realized, for example, by one or more servers 120 and/or the remote client devices 180 executing software instructions downloaded from the one or more servers 120.

The graphical user interface 280 may be any interface that outputs information (including the snowfall probability distributions discussed below) for display to a user. The graphical user interface 280 may be generated by a web server (e.g., one of the server(s) 120) for display to users of the remote client devices 180 via web browsers. Additionally or alternatively, the graphical user interface 280 may be generated by local software (e.g., a mobile application) stored on the remote client devices 180.

As described above, current forecasting methods produce deterministic forecasts 248 that include a specific snowfall accumulation (often a range) representing a best guess of a meteorologist (or group of meteorologists) making subjective determinations based on information from those mathematical models and the meteorologist's training and experience. Those deterministic forecasts 248, however, do not convey additional information such as the probability that snowfall will be within the forecasted snowfall accumulation range and the probabilities of other snowfall accumulation amounts. As described in detail below, the snowfall probability distribution forecasting system 200 uses a rules-based process to leverage third party weather forecasts 242, including members of ensemble forecasts, to generate snowfall probability distributions forecasting the most likely snowfall accumulation range, the probability that snowfall accumulation will be within the most likely snowfall accumulation range, and probabilities that snowfall accumulation will be outside of the most likely snowfall accumulation range.

To ensure consistency between a deterministic forecast 248 and the most likely snowfall accumulation range indicated by a snowfall probability distribution, the snowfall probability distribution forecasting system 200 may shift the snowfall probability distribution so that the forecasted snowfall accumulation in the deterministic forecast 248 falls within the most likely snowfall accumulation range of the snowfall probability distribution. Furthermore, because third party weather forecasts 242 can produce a non-normal distribution of snowfall accumulation forecasts, the snowfall probability distribution forecasting system 200 may normalize the data so that the probabilities of each snowfall accumulation range decrease from the most likely snowfall accumulation range of the snowfall probability distribution to the tails of the snowfall probability distribution.

Figure 3:
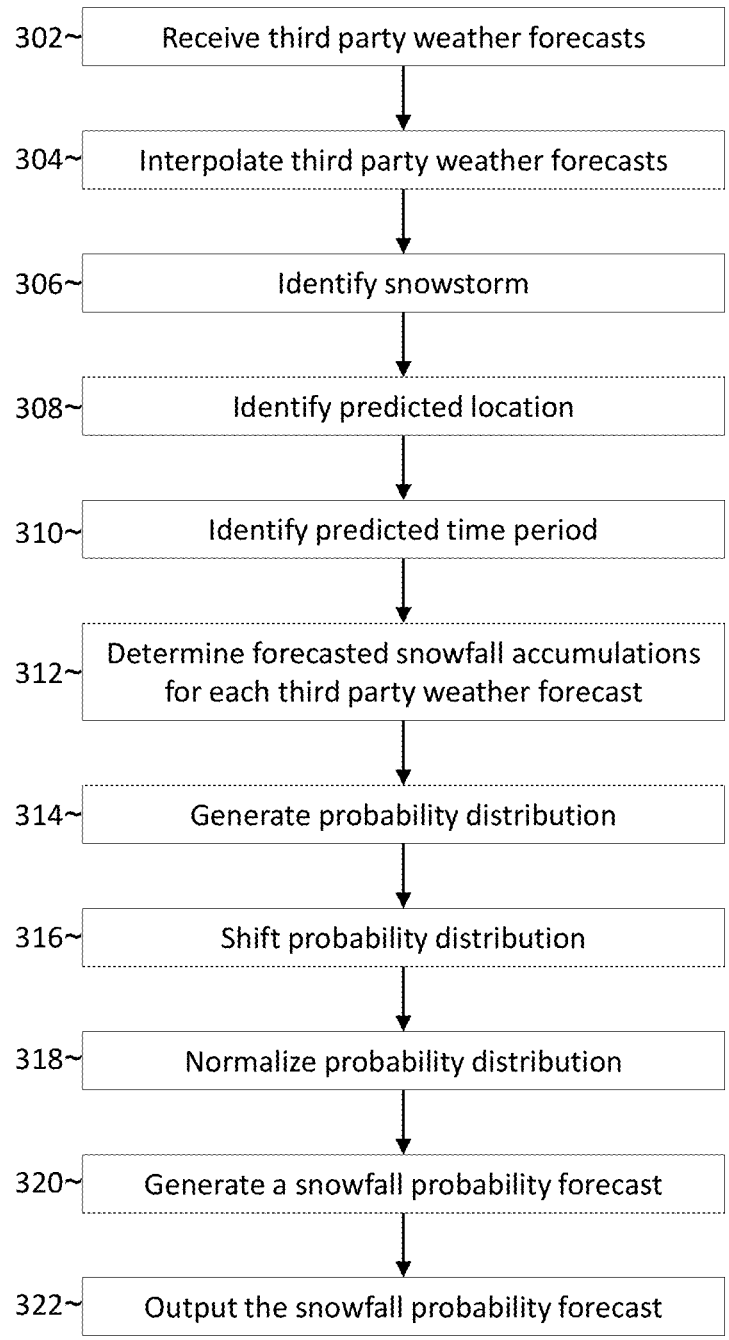
FIG. 3 is a flowchart illustrating a process for generating a snowfall probability distribution according to an exemplary embodiment of the present invention.

FIG. 3 is a flowchart illustrating a process 300 for generating a snowfall probability distribution according to an exemplary embodiment of the present invention. The snowfall probability distribution process 300 is performed by the analysis unit 260 (e.g., by the server 120).

While the process 300 is described below as generating a snowfall probability distribution, one of ordinary skill in the art would recognize that a similar process may be used to generate probability distributions of other forecasted weather conditions, including rainfall amount, liquid equivalent amount, ice accumulation, wind speed, temperature, etc.

Third party weather forecasts 242 are received in step 302. The third party weather forecasts 242 may include, for example, a deterministic forecast from the NCEP GFS, 20 members of the GEFS ensemble, 26 members of the SREF ensemble, and 26 members of the ECMWF ensemble prediction system. The NCEP GFS forecast, the GEFS members, and the SREF members may be received from the NCEP server 112. The ECMWF members may be received from the ECMWF server 114.

Third party weather forecasts 242 are interpolated to conform to a uniform geographic grid in step 304.

A snowstorm is identified in step 306. A snowstorm may be identified, for example, when a winter weather message 246 contains a forecasted snowfall accumulation. Alternatively, a snowstorm may be identified when a deterministic forecast 248 indicates a forecasted snowstorm or a magnitude of forecasted snowfall accumulation.

A predicted location is identified in step 308. The predicted location may be, for example, the location identified in the winter weather message 246. Alternatively, the predicted location of the snowstorm may be, for example, the location indicated by the deterministic forecast 248 indicating a forecasted snowstorm or a magnitude of forecasted snowfall accumulation.

A predicted time period is identified in step 310. The predicted time period may be, for example, the time period specified in the winter weather message 246. Alternatively, the predicted time period may be, for example, the forecasted time period of the forecasted snowstorm in the deterministic forecast 248.

For each third party weather forecast 242, the forecasted snowfall accumulation in the predicted location during the predicted time period is determined in step 312. The forecasted snowfall accumulation may be determined using the Cobb method, where a snow-to-liquid ratio is calculated (based on forecasted temperature, forecasted vertical motion, and forecasted relative humidity) and the quantitative precipitation forecast is multiplied by the calculated snow-to-liquid ratio. In some instances, a third party weather forecast 242 may include classifying the precipitation of falling during certain time periods (e.g., as snow, rain, sleet, or mix). In those instances, the forecasted snowfall accumulation may be determined by outputting the quantitative precipitation forecast classified as snow.

A snowfall probability distribution is generated in step 314 based on the snowfall accumulation forecasts determined in step 312. The snowfall probability distribution is generated by identifying a series of consecutive, non-overlapping snowfall accumulation ranges; forming an ensemble histogram by determining how many of the snowfall accumulation forecasts are in each snowfall accumulation range; calculating a probability density function based on the ensemble histogram; and forming a snowfall probability distribution based on the probability density function.

The process for generating a snowfall probability distribution is described below with reference to an example scenario where ten third party weather forecasts 242 have snowfall accumulation forecasts for the predicted location during the predicted time period as follows:

Member 1: 2 inches
Member 2: 1 inch
Member 3: 3.5 inches
Member 4: 3.5 inches
Member 5: 4 inches
Member 6: 8 inches
Member 7: 7.5 inches
Member 8: 2 inches
Member 9: 5 inches
Member 10: 1 inches The snowfall accumulation forecasts from the third party weather forecasts 242 are then binned into the identified snowfall accumulation ranges. For example, using 1 inch snowfall accumulation ranges, the example snowfall accumulation forecasts are binned as follows:

0-1 inch: 0 (0 percent)
1-2 inches: 2 (20 percent)
2-3 inches: 2 (20 percent)
3-4 inches: 2 (20 percent)
4-5 inches: 1 (10 percent)
5-6 inches: 1 (10 percent)
6-7 inches: 0 (0 percent)
7-8 inches: 1 (10 percent)
8-9 inches: 1 (10 percent)

The snowfall accumulation ranges may be predetermined. Alternatively, the snowfall accumulation ranges may be identified based on the snowfall accumulation forecasts. In an exemplary embodiment, five snowfall accumulation ranges are identified representing the lowest snowfall accumulation, a low snowfall accumulation, the most likely snowfall accumulation, a higher snowfall accumulation, and the highest snowfall accumulation. However, snowfall accumulation may be divided into any number of snowfall accumulation ranges. For example, if three snowfall accumulation ranges are identified, then the example snowfall accumulation forecasts are binned as follows:

0-3 inches: 40 percent
3-6 inches: 40 percent
6-9 inches: 20 percent

In essence, the snowfall probability distribution forecasting system 200 generates a snowfall probability distribution where the probability that forecasted snowfall accumulation in the predicted location during the predicted time period will be within each snowfall accumulation range is the percentage of third party weather forecasts 242 with a snowfall accumulation forecast within each snowfall accumulation range.

The snowfall probability distribution generated in step 314 may optionally be shifted based on the deterministic forecast 348 in step 316. For example, the original snowfall probability distribution (generated in step 314) may be shifted such that the mode of the shifted snowfall probability distribution is equal to the forecasted snowfall accumulation in the deterministic forecast 348. (The forecasted snowfall accumulation in the deterministic forecast 348 may be calculated, for example, using the Cobb method as described above.) The difference between the mean of the original snowfall probability distribution and the shifted snowfall probability distribution is used as a weight to shift every point in the original snowfall probability distribution. Accordingly, the snowfall probability distribution forecasting system 200 creates a shifted snowfall probability distribution where the every point in the shifted snowfall probability distribution is influenced by the deterministic forecast 348.

The (original or optionally shifted) snowfall probability distribution may optionally be normalized in step 318. For example, the snowfall probability distribution forecasting system 200 may perform an iterative process where data points from the far tails are moved toward the mean (or mode or median) of the probability distribution until the probabilities of each snowfall accumulation range decrease from the mode (or median or mean) of the snowfall probability distribution to the tails of the snowfall probability distribution.

Figure 4:
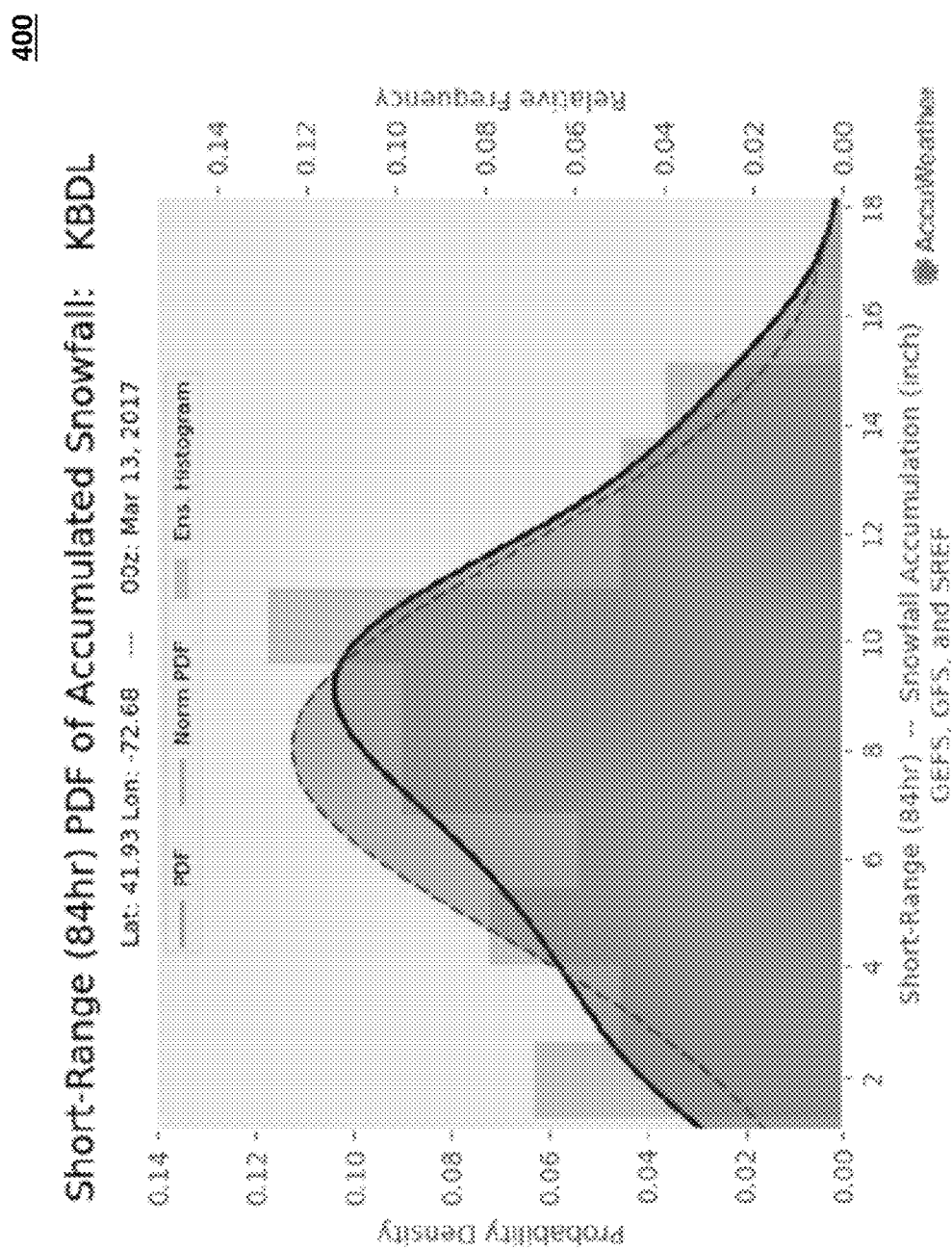
FIG. 4 is a graph illustrating an example ensemble histogram, an example probability density function, and an example normalized probability density function.

FIG. 4 is a graph 400 illustrating an example ensemble histogram, an example probability density function, and an example normalized probability density function. (Note that the example illustrated in FIG. 4 does not match the example above.)

In the embodiments described above, each third party weather forecast 242 is weighted equally when generating the snowfall probability distribution. In other embodiments, however, third party weather forecasts 242 may be weighted based on their past accuracy for forecasting snowfall accumulation. For example, the snowfall probability distribution forecasting system 200 may use the past snowfall accumulations 252 and the third party weather forecasts 242 (and, optionally deterministic forecasts 248) for the locations and time periods of the snowfall accumulations 252 to construct a statistical model where each of the third party weather forecasts 242 are weighted to form a snowfall probability distribution that most accurately predicts the past snowfall accumulations 252. Accordingly, even if the accuracy of some or all of the third party weather forecasts 242 changes over time (due to changes in climatological conditions or the third party weather forecasts 242), the snowfall probability distribution forecasting system 200 is able to generate snowfall probability distributions that most accurately forecast future snowfall accumulations.

A snowfall probability forecast is generated in step 320. The snowfall probability forecast includes the most probable snowfall distribution range and the probability, based on the snowfall probability distribution, that snowfall accumulation in the predicted location during the predicted time period will be within the most likely snowfall accumulation range. The snowfall probability forecast may also include a higher snowfall accumulation range (and the probability, based on the snowfall probability distribution, that snowfall accumulation will be within the higher snowfall accumulation range) and a lower snowfall accumulation range (and the probability, based on the snowfall probability distribution, that snowfall accumulation will be within the higher snowfall accumulation range).

The snowfall probability forecast is output in step 322. In the simplest embodiments, the snowfall probability forecast is output to a remote client device 180 for display to a user via the graphical user interface 280. For example, the snowfall probability forecast may be displayed as part of a web page or mobile application. In other embodiments, the snowfall probability forecast may be output to a remote client device 180 to control a hardware or software device in response to information included in a snowfall probability forecast. To cite just one example, the snowfall probability forecast may be output to a railway system that may be configured to divert or cancel a train route if the probability of snow accumulation at or above an accumulation threshold meets or exceeds a probability threshold.

Figure 5:
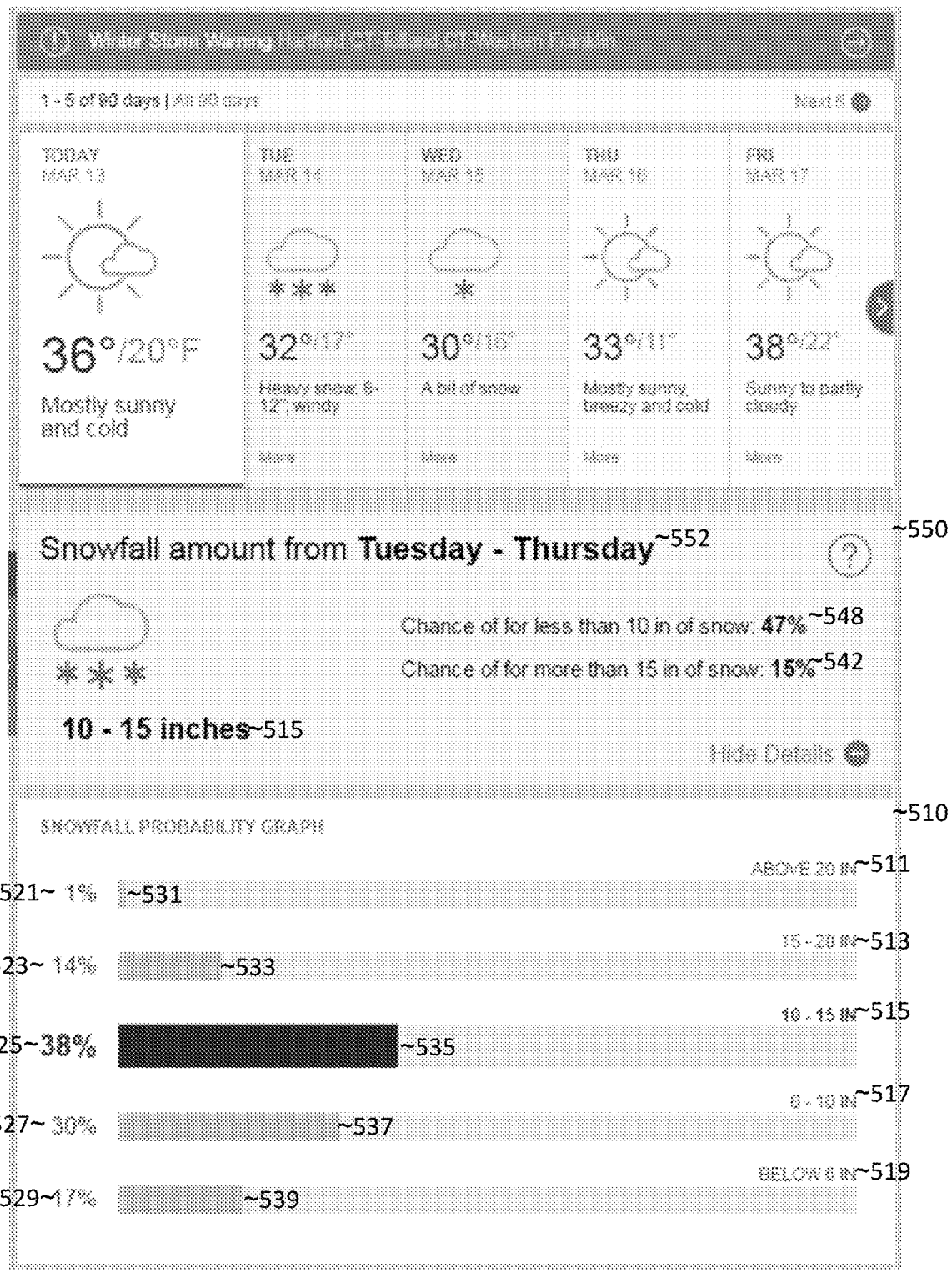
FIG. 5 is a view output by the graphical user interface that includes a snowfall probability forecast generated using the histogram shown in FIG. 4 according to an exemplary embodiment of the present invention.

FIG. 5 illustrates a view 500 output by the graphical user interface 280 that includes a snowfall probability forecast generated using the histogram shown in FIG. 4 according to an exemplary embodiment of the present invention.

As shown in FIG. 5, the view 500 may include a textual display 550 and/or a bar graph 510. The bar graph 510, for example, may include the most likely snowfall accumulation range 515, the probability 525 that snowfall accumulation will be within the most likely snowfall accumulation range 515, and a visual representation 535 of the probability 525 that snowfall accumulation will be within the most likely snowfall accumulation range 515; a higher snowfall accumulation range 513, the probability 523 that snowfall accumulation will be within the higher snowfall accumulation range 513, and a visual representation 533 of the probability 523 that snowfall accumulation will be within the higher snowfall accumulation range 513; a lower snowfall accumulation range 517, the probability 527 that snowfall accumulation will be within the lower snowfall accumulation range 517, and a visual representation 537 of the probability 527 that snowfall accumulation will be within the lower snowfall accumulation range 517; the highest snowfall accumulation range 511, the probability 521 that snowfall accumulation will be within the highest snowfall accumulation range 511, and a visual representation 531 of the probability 521 that snowfall accumulation will be within the highest snowfall accumulation range 511; and the lowest snowfall accumulation range 519, the probability 529 that snowfall accumulation will be within the lowest snowfall accumulation range 519, and a visual representation 539 of the probability 529 that snowfall accumulation will be within the lowest snowfall accumulation range 519.

The textual display 550 may include the most likely snowfall accumulation range 515, the probability 548 that the snowfall accumulation will be lower than the most likely snowfall accumulation range 515, and the probability 542 that the snowfall accumulation will be lower than the most likely snowfall accumulation range 515.

The view 500 may also include the predicted location 552.

Figure 6:
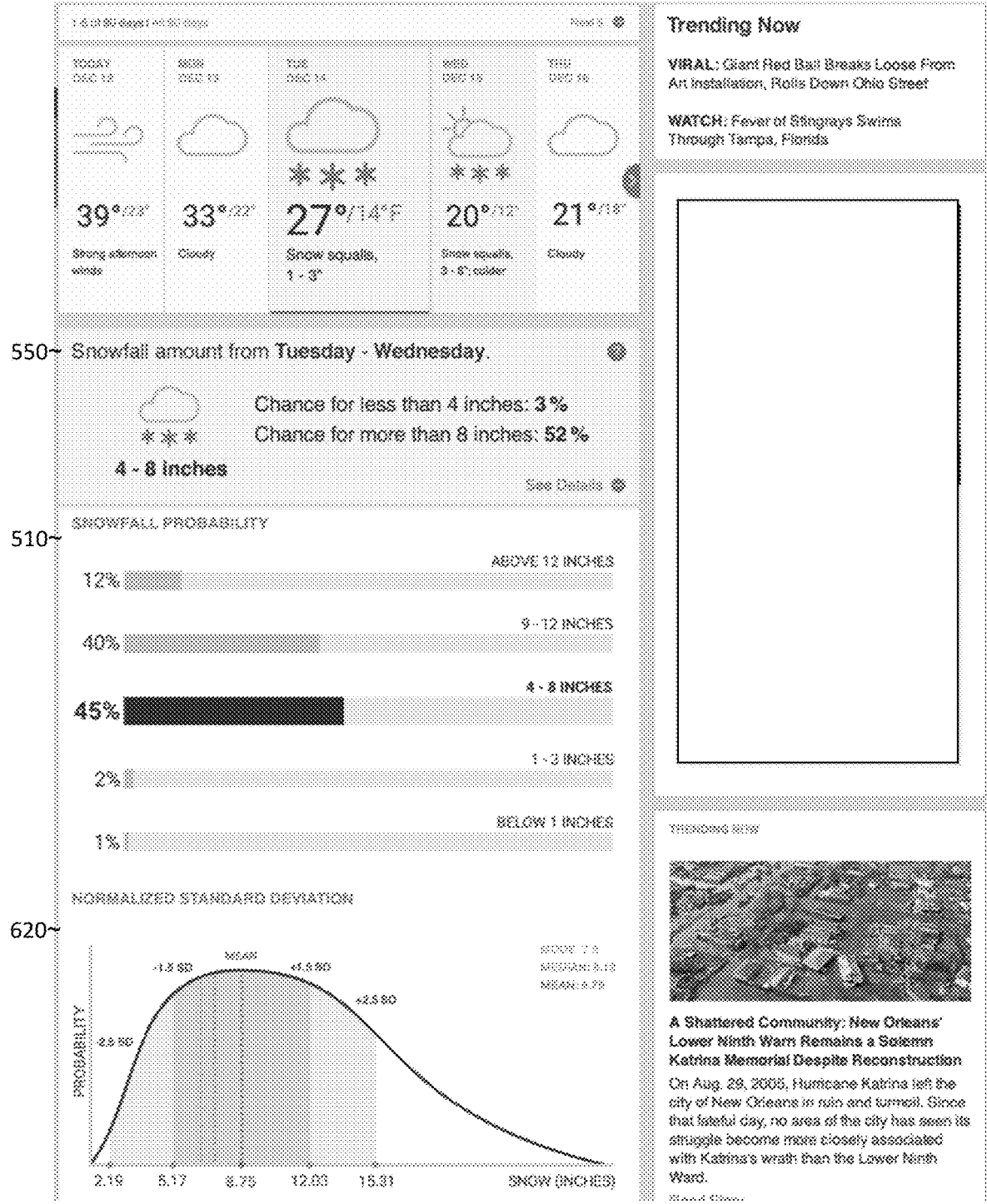
FIG. 6 is a view output by the graphical user interface that includes a snowfall probability forecast according to another exemplary embodiment of the present invention.

FIG. 6 illustrates a view 600 output by the graphical user interface 280 that includes a snowfall probability forecast according to another exemplary embodiment of the present invention.

As shown in FIG. 6, the view 600 is similar to the view 500 in that it includes a textual display 550 and a bar graph 510. Additionally, the view 600 includes a line graph 620 illustrating the probabilities (along the y-axis) as function of snowfall accumulation (along the x-axis). The line graph 620 may include a visual representation of the mode, median, and mean of the probability distribution. The line graph 620 may be labeled at certain intervals. For example, as shown in FIG. 6, the line graph 620 may be labeled along the x-axis at the mean, 1.5 standard deviations from the mean, and 2.5 standard deviations from the mean.

The graphical user interface 280 may output different views for different users. For example, different views may be output to individual website visitors, mobile application users, commercial users, government agencies, etc.

Figure 7:
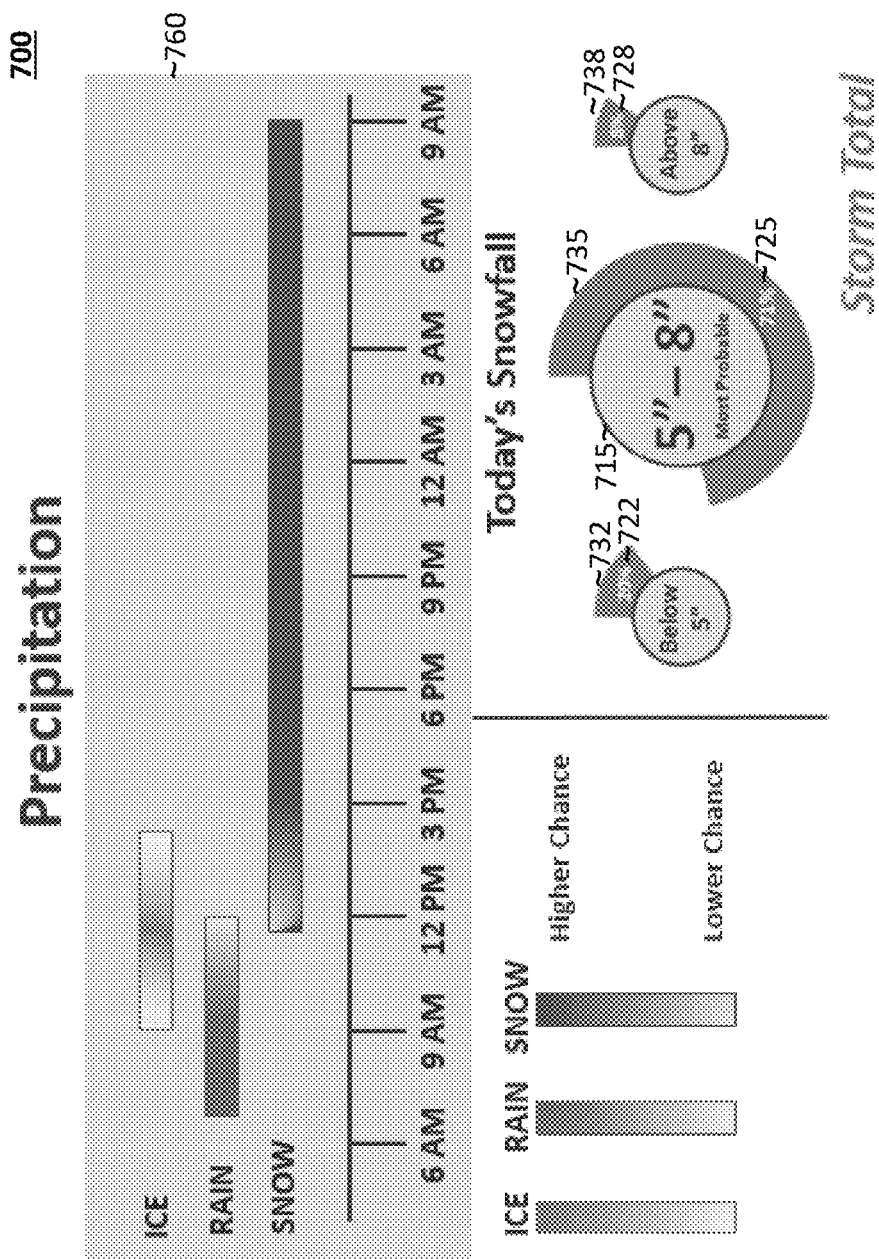
FIG. 7 is a view output by the graphical user interface that includes a snowfall probability forecast according to another exemplary embodiment of the present invention.

FIG. 7 illustrates a view 700 output by the graphical user interface 280 that includes a snowfall probability forecast according to another exemplary embodiment of the present invention.

As shown in FIG. 7, the view 700 includes the most likely snowfall accumulation range 715, the probability 725 that snowfall accumulation will be within the most likely snowfall accumulation range 715, and a visual representation 735 of the probability 725 that snowfall accumulation will be within the most likely snowfall accumulation range 715. The view 700 also includes the probability 728 that snowfall accumulation will be higher than the most likely snowfall accumulation range 715 and a visual representation 738 of the probability 728 that snowfall accumulation will be higher than the most likely snowfall accumulation range 715. The view 700 also includes the probability 722 that snowfall accumulation will be lower than the most likely snowfall accumulation range 715 and a visual representation 732 of the probability 722 that snowfall accumulation will be lower than the most likely snowfall accumulation range 715. The view 700 also includes a visual representation 760 of the predicted time period and probabilities of various precipitation types during the predicted time period.

Figure 8:
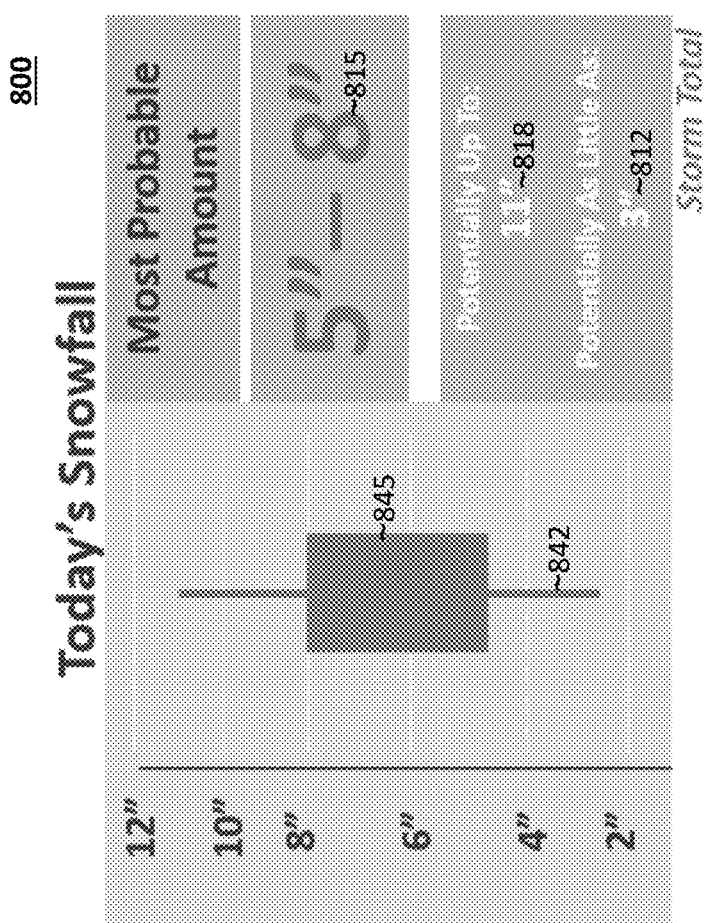
FIG. 8 is a view output by the graphical user interface that includes a snowfall probability forecast according to another exemplary embodiment of the present invention.

FIG. 8 illustrates a view 800 output by the graphical user interface 280 that includes a snowfall probability forecast according to another exemplary embodiment of the present invention.

As shown in FIG. 8, the view 800 includes the most likely snowfall accumulation range 815 and a visual representation 845 of the most likely snowfall accumulation range 815. The view 800 also includes the highest accumulation forecast 818 and the lowest accumulation forecast 812 as well as a visual representation 842 from the highest accumulation forecast 818 and the lowest accumulation forecast 812. The highest accumulation forecast 818 may be, for example, the largest snowfall accumulation forecasted by a single third party forecast 242 and the lowest accumulation forecast 812 may be the smallest snowfall accumulation forecasted by a single third party forecast 242. Alternatively, the highest accumulation forecast 818 and the lowest accumulation forecast 812 may be the largest and smallest forecasted by a predetermined number or percentages of third party forecasts 242.

Figure 9:
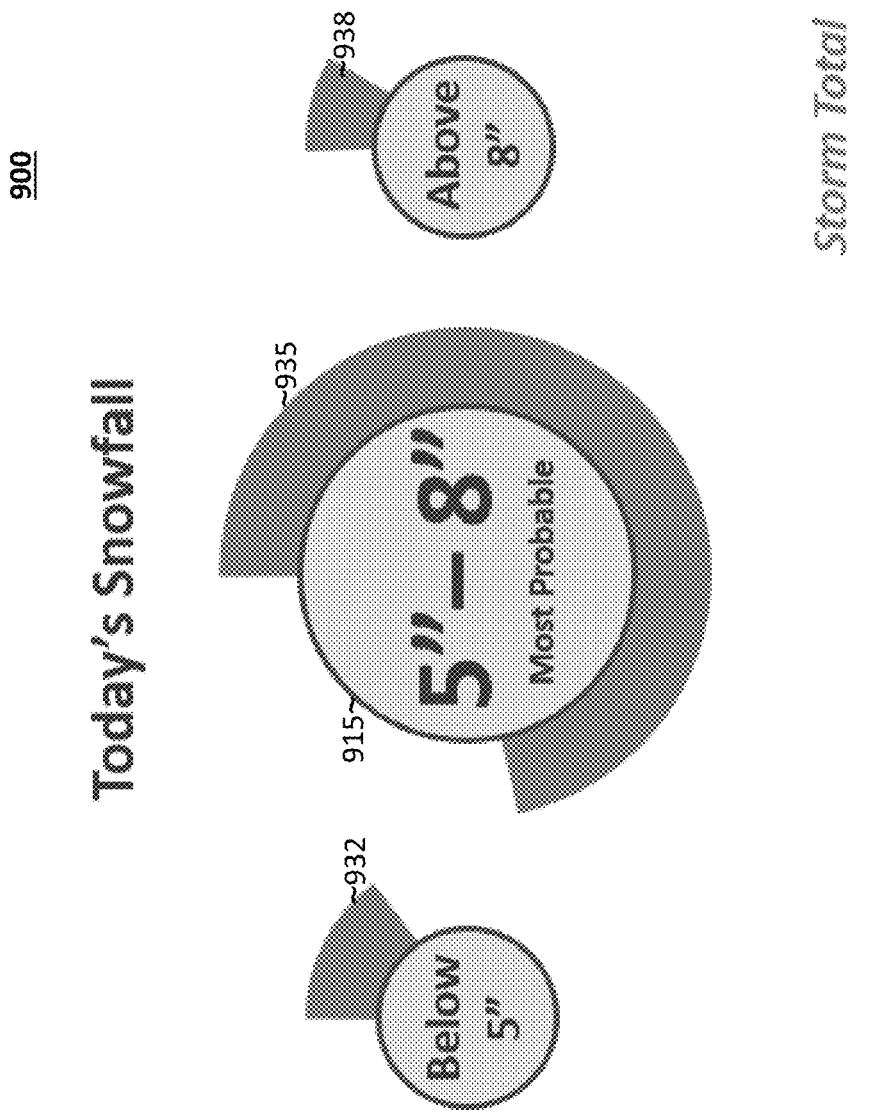
FIG. 9 is a view output by the graphical user interface that includes a snowfall probability forecast according to another exemplary embodiment of the present invention.

FIG. 9 illustrates a view 900 output by the graphical user interface 280 that includes a snowfall probability forecast according to another exemplary embodiment of the present invention.

As shown in FIG. 9, the view 900 includes the most likely snowfall accumulation range 915 and a visual representation 935 of the probability that snowfall accumulation will be within the most likely snowfall accumulation range 915. The view 900 also includes a visual representation 938 of the probability that snowfall accumulation will be higher than the most likely snowfall accumulation range 915 and a visual representation 932 of the probability that snowfall accumulation will be lower than the most likely snowfall accumulation range 915.

Figure 10:
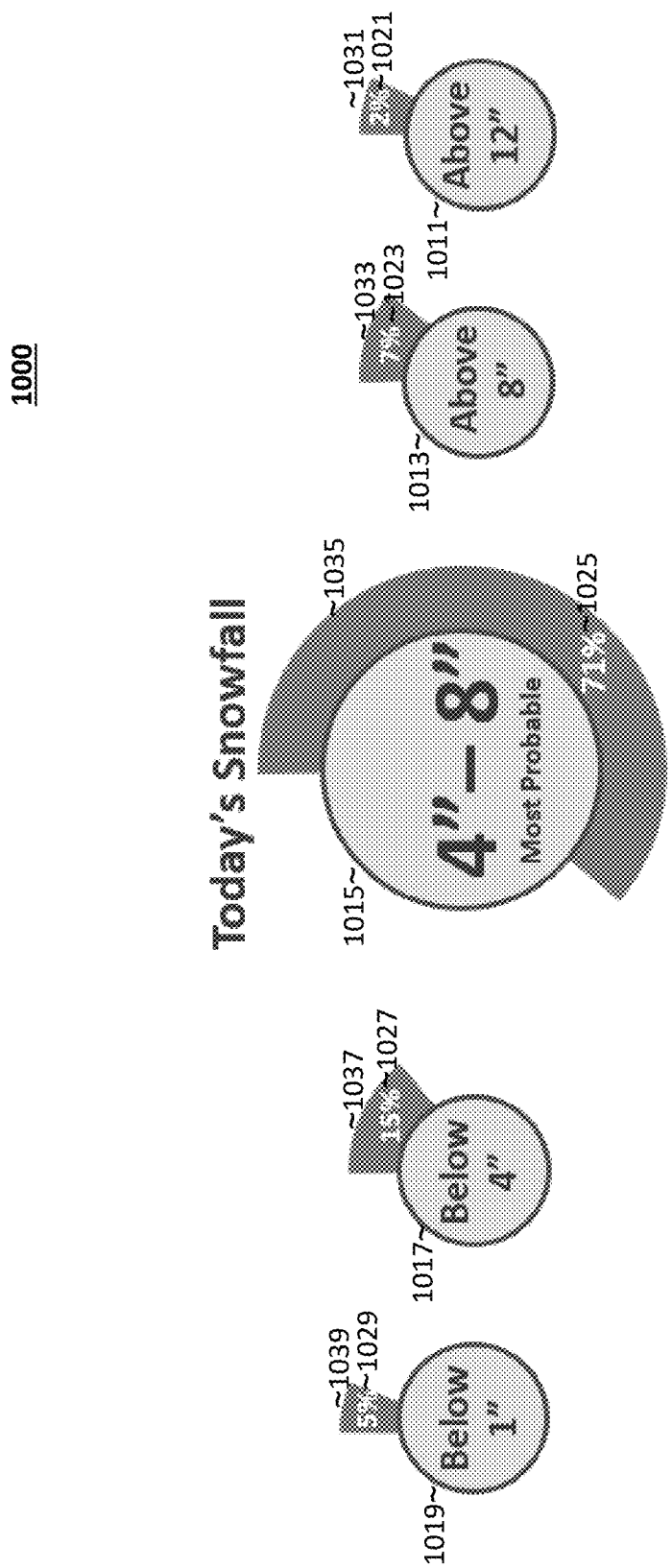
FIG. 10 is a view output by the graphical user interface that includes a snowfall probability forecast according to another exemplary embodiment of the present invention.

FIG. 10 illustrates a view 1000 output by the graphical user interface 280 that includes a snowfall probability forecast according to another exemplary embodiment of the present invention.

As shown in FIG. 10, the view 1000 includes the most likely snowfall accumulation range 1015, the probability 1025 that snowfall accumulation will be within the most likely snowfall accumulation range 1015, and a visual representation 1035 of the probability 1025 that snowfall accumulation will be within the most likely snowfall accumulation range 1015; a higher snowfall accumulation range 1013, the probability 1023 that snowfall accumulation will be within the higher snowfall accumulation range 1013, and a visual representation 1033 of the probability 1023 that snowfall accumulation will be within the higher snowfall accumulation range 1013; a lower snowfall accumulation range 1017, the probability 1027 that snowfall accumulation will be within the lower snowfall accumulation range 1017, and a visual representation 1037 of the probability 1027 that snowfall accumulation will be within the lower snowfall accumulation range 1017; the highest snowfall accumulation range 1011, the probability 1021 that snowfall accumulation will be within the highest snowfall accumulation range 1011, and a visual representation 1031 of the probability 1021 that snowfall accumulation will be within the highest snowfall accumulation range 1011; and the lowest snowfall accumulation range 1019, the probability 1029 that snowfall accumulation will be within the lowest snowfall accumulation range 1019, and a visual representation 1039 of the probability 1029 that snowfall accumulation will be within the lowest snowfall accumulation range 1019.

While preferred embodiments have been set forth above, those skilled in the art who have reviewed the present disclosure will readily appreciate that other embodiments can be realized within the scope of the invention. Disclosures of specific numbers of hardware components and software modules are illustrative rather than limiting. Accordingly, the present invention should be construed as limited only by the appended claims.

The invention claimed is:

1. A method of forecasting snowfall accumulation, the method comprising:
   identifying a predicted location and a predicted time period of a snowstorm;
   receiving a plurality of weather forecasts for the predicted time period in the predicted location;
   for each of the plurality of weather forecasts, determining a snowfall accumulation forecast;
   forming an ensemble histogram by identifying a series of consecutive, non-overlapping snowfall accumulation ranges and determining how many of the snowfall accumulation forecasts are in each of the snowfall accumulation ranges;
   calculating a probability density function representing the relative likelihood of snowfall accumulation amounts based on the ensemble histogram;
   forming a snowfall probability distribution based on the probability density function, the snowfall probability distribution including:
      a most likely snowfall accumulation range and a probability that snowfall accumulation in the predicted location over the predicted time period will be within the most likely snowfall accumulation range;
      at least one higher snowfall accumulation range and a probability that snowfall accumulation in the predicted location over the predicted time period will be within the higher snowfall accumulation range; and
      at least one lower snowfall accumulation range and a probability that snowfall accumulation in the predicted location over the predicted time period will be within the lower snowfall accumulation range;
   generating a snowfall probability forecast that includes the most likely snowfall accumulation range and the probability that snowfall accumulation in the predicted location over the predicted time period will be within the most likely snowfall accumulation range; and
   outputting the snowfall probability forecast.

2. The method of claim 1, further comprising:
   identifying a deterministic snowfall accumulation forecast for the predicted location over the time period;
   creating an adjusted probability density function by:
      making a mode of the adjusted probability density function equal to the deterministic snowfall accumulation forecast;
      calculating a difference between a mean of the probability density function and the deterministic snowfall accumulation forecast; and
      shifting the probability density function based on the difference between the mean of the probability density function and the deterministic snowfall accumulation forecast, wherein the snowfall probability forecast is based on the adjusted probability density function.

3. The method of claim 1, further comprising:
   creating a normalized probability density function by moving data points from far tails of the probability density function toward the mean of the probability density function until the probabilities of each snowfall accumulation range decrease from the most likely snowfall accumulation range to the tails of the snowfall probability distribution, wherein the snowfall probability forecast is based on the normalized probability density function.

4. The method of claim 1, wherein the snowfall probability forecast further includes:
the higher snowfall accumulation range and the probability that snowfall accumulation in the predicted location over the predicted time period will be within the higher snowfall accumulation range; and
the lower snowfall accumulation range and the probability that snowfall accumulation in the predicted location over the predicted time period will be within the lower snowfall accumulation range.

5. The method of claim 4, wherein the snowfall probability forecast further includes: a highest snowfall accumulation range and the probability that snowfall accumulation in a predicted location over the predicted time period will be within the highest snowfall accumulation range; and a lowest snowfall accumulation range and a probability that snowfall accumulation in the predicted location over the predicted time period will be within the lowest snowfall accumulation range.

6. The method of claim 1, wherein the snowfall accumulation forecasts are determined based on the plurality of weather forecasts using a Cobb method.

7. The method of claim 6, wherein:
each of the plurality of weather forecasts include a forecasted precipitation amount, a forecast forecasted temperature, a forecasted vertical motion, and a forecasted relative humidity; and
the snowfall accumulation forecasts are determined by:
calculating a snow-to-liquid ratio based on the forecasted temperature, the forecasted vertical motion, and the forecasted relative humidity; and
multiplying the forecast precipitation amount by the snow-to-liquid ratio.

8. The method of claim 1, wherein the snowfall probability forecast is output to a remote device for display to a user via a graphical user interface.

9. The method of claim 1, wherein the snowfall probability forecast is output to control a remote device.

10. The method of claim 1, wherein the plurality of weather forecasts includes at least one of the National Centers for Environmental Prediction (NCEP) Global Forecast System (GFS), one or more members of the Global Ensemble Forecast System (GEFS), one or more members of the NCEP Short Range Ensemble Forecast (SREF), or one or more members of the European Centre for Medium-Range Weather (ECMWF) ensemble.

11. A system, comprising:
a forecast database that stores a plurality of weather forecasts;
an analysis unit that:
identifies a predicted location and a predicted time period of a snowstorm;
for each of the plurality of weather forecasts, determines a snowfall accumulation forecast;
forms an ensemble histogram by identifying a series of consecutive, non-overlapping snowfall accumulation ranges and determining how many of the snowfall accumulation forecasts are in each of the snowfall accumulation ranges;
calculates a probability density function representing the relative likelihood of snowfall accumulation amounts based on the ensemble histogram;
forms a snowfall probability distribution based on the probability density function, the snowfall probability distribution including:
a most likely snowfall accumulation range and a probability that snowfall accumulation in the predicted location over the predicted time period will be within the most likely snowfall accumulation range;
at least one higher snowfall accumulation range and a probability that snowfall accumulation in the predicted location over the predicted time period will be within the higher snowfall accumulation range; and
at least one lower snowfall accumulation range and a probability that snowfall accumulation in the predicted location over the predicted time period will be within the lower snowfall accumulation range;
generates a snowfall probability forecast that includes the most likely snowfall accumulation range and the probability that snowfall accumulation in the predicted location over the predicted time period will be within the most likely snowfall accumulation range; and
outputs the snowfall probability forecast.

12. The system of claim 11, wherein:
the forecast database further includes a deterministic snowfall accumulation forecast for the predicted location over the time period; and
the analysis unit is further configured to:
create an adjusted probability density function by:
making a mode of the adjusted probability density function equal to the deterministic snowfall accumulation forecast;
calculating a difference between a mean of the probability density function and the deterministic snowfall accumulation forecast; and
shifting the probability density function based on the difference between the mean of the probability density function and the deterministic snowfall accumulation forecast,
wherein the snowfall probability forecast is based on the adjusted probability density function.

13. The system of claim 11, wherein the analysis unit is further configured to:
create a normalized probability density function by moving data points from far tails of the probability density function toward the mean of the probability density function until the probabilities of each snowfall accumulation range decrease from the most likely snowfall accumulation range to the tails of the snowfall probability distribution,
wherein the snowfall probability forecast is based on the normalized probability density function.

14. The system of claim 11, wherein the snowfall probability forecast further includes:
the higher snowfall accumulation range and the probability that snowfall accumulation in the predicted location over the predicted time period will be within the higher snowfall accumulation range; and
the lower snowfall accumulation range and the probability that snowfall accumulation in the predicted location over the predicted time period will be within the lower snowfall accumulation range.

15. The system of claim 14, wherein the snowfall probability forecast further includes:
   a highest snowfall accumulation range and a probability that snowfall accumulation in the predicted location over the predicted time period will be within the highest snowfall accumulation range; and
   a lowest snowfall accumulation range and a probability that snowfall accumulation in the predicted location over the predicted time period will be within the lowest snowfall accumulation range.

16. The method of claim 11, wherein the analysis unit is further configured to determine the snowfall accumulation forecasts based on the plurality of weather forecasts using a Cobb method.

17. The method of claim 16, wherein:
   each of the plurality of weather forecasts include a forecasted precipitation amount, a forecast forecasted temperature, a forecasted vertical motion, and a forecasted relative humidity; and
   the analysis unit is configured to determine the snowfall accumulation forecasts by:
      calculating a snow-to-liquid ratio based on the forecasted temperature, the forecasted vertical motion, and the forecasted relative humidity; and
      multiplying the forecast precipitation amount by the snow-to-liquid ratio.

18. The method of claim 11, wherein the analysis unit outputs the snowfall probability forecast to a remote device for display to a user via a graphical user interface.

19. The method of claim 11, wherein the analysis unit outputs the snowfall probability forecast to control a remote device.

20. The method of claim 11, wherein the plurality of weather forecasts includes at least one of the National Centers for Environmental Prediction (NCEP) Global Forecast System (GFS), one or more members of the Global Ensemble Forecast System (GEFS), one or more members of the NCEP Short Range Ensemble Forecast (SREF), or one or more members of the European Centre for Medium-Range Weather (ECMWF) ensemble.

21. A non-transitory computer readable storage medium storing instructions that, when executed by a computer processor, cause a computing system to:
   identify a predicted location and a predicted time period of a snowstorm;
   receive a plurality of weather forecasts for the predicted time period in the predicted location;
   for each of the plurality of weather forecasts, determine a snowfall accumulation forecast;
   form an ensemble histogram by identifying a series of consecutive, non-overlapping snowfall accumulation ranges and determining how many of the snowfall accumulation forecasts are in each of the snowfall accumulation ranges;
   calculate a probability density function representing the relative likelihood of snowfall accumulation amounts based on the ensemble histogram;
   form a snowfall probability distribution based on the probability density function, the snowfall probability distribution including:
      a most likely snowfall accumulation range and a probability that snowfall accumulation in the predicted location over the predicted time period will be within the most likely snowfall accumulation range;
      at least one higher snowfall accumulation range and a probability that snowfall accumulation in the predicted location over the predicted time period will be within the higher snowfall accumulation range; and
      at least one lower snowfall accumulation range and a probability that snowfall accumulation in the predicted location over the predicted time period will be within the lower snowfall accumulation range;
   generate a snowfall probability forecast that includes the most likely snowfall accumulation range and the probability that snowfall accumulation in the predicted location over the predicted time period will be within the most likely snowfall accumulation range; and
   output the snowfall probability forecast.

\* \* \* \* \*